United States Patent
Peng

(10) Patent No.: US 11,365,817 B2
(45) Date of Patent: Jun. 21, 2022

(54) HIGH FLOW VALVE SEAT FOR WATER CONTROL VALVE

(71) Applicant: KUCHING INTERNATIONAL LTD., Taichung (TW)

(72) Inventor: Hao-Nan Peng, Taichung (TW)

( * ) Notice: Subject to any disclaimer, the term of this patent is extended or adjusted under 35 U.S.C. 154(b) by 0 days.

(21) Appl. No.: 17/016,805

(22) Filed: Sep. 10, 2020

(65) Prior Publication Data

US 2022/0074506 A1    Mar. 10, 2022

(51) Int. Cl.
  *F16K 27/04* (2006.01)
  *F16K 11/02* (2006.01)
  *F16K 11/085* (2006.01)

(52) U.S. Cl.
  CPC .......... *F16K 11/02* (2013.01); *F16K 11/085* (2013.01); *F16K 27/045* (2013.01); *Y10T 137/86815* (2015.04); *Y10T 137/9464* (2015.04)

(58) Field of Classification Search
  CPC ....... Y10T 137/86823; Y10T 137/2521; Y10T 137/2514; Y10T 137/9464; F16K 27/045; F16K 11/0743
  USPC ..................................................... 4/676, 675
  See application file for complete search history.

(56) References Cited

U.S. PATENT DOCUMENTS

| 2,204,257 | A | * | 6/1940 | Powers | F16K 11/185 137/636.3 |
| 2012/0018009 | A1 | * | 1/2012 | Veros | F16K 27/045 137/454.2 |
| 2012/0018020 | A1 | * | 1/2012 | Moore | E03C 1/0403 137/798 |
| 2016/0168831 | A1 | * | 6/2016 | Hansen | F16K 27/045 137/15.17 |
| 2020/0408313 | A1 | * | 12/2020 | Allen | E03C 1/0412 |

* cited by examiner

*Primary Examiner* — Robert K Arundale
(74) *Attorney, Agent, or Firm* — Egbert, McDaniel & Swartz, PLLC

(57) ABSTRACT

Disclosed is a high flow valve seat for a water control valve, including a main body, wherein the main body has one end and a circumferential part. The main body forms a waterway and several flow channels which straight extend from the end into the main body respectively. The main body forms several through holes connected to the flow channels respectively. The flow channel is formed of a first wall surface, a second wall surface and a third wall surface. The first wall surface is laterally adjacent to the circumferential part. The second wall surface and the third wall surface abut on both sides of the first wall surface respectively, and the second wall surface and the third wall surface extend away from the circumferential part respectively, so as to enlarge the cross-section area of the flow channel and to increase the flow of water to the valve core structure.

4 Claims, 4 Drawing Sheets

HIGH FLOW VALVE SEAT FOR WATER CONTROL VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a component of water control valve, and more particularly to an innovative structure type of high flow valve seat for water control valve.

2. Description of Related Art Including Information Disclosed Under 37 CFR 1.97 and 37 CFR 1.98

A water control valve mainly comprises a valve seat and a valve core structure, wherein the valve seat has an abutting end, the abutting end is in watertight connection to the valve core structure. Several flow channels are disposed in the valve seat. One end of the flow channel forms a water inlet outside the valve seat, the other end of the flow channel extends to the abutting end to form a water outlet, so that the flow channels are connected to the valve core structure respectively. Several different water sources are connected to the water inlets through pipeline respectively, so that the water sources supply water to the flow channels respectively, the valve core structure is operated to mix the water from the water sources before it flows out of the water control valve, and the water from a specific water source can be selected to flow out of the water control valve.

However, this structure type still has the following problems according to practical experience. The pipeline is usually formed of tubes with circular sections, based on convenience of connection between the pipeline and the water inlet, the water inlet is circular, with the shaping convenience of the flow channel, so that the section of the flow channel and the water outlet are circular, multiple circular water outlets are formed at the abutting end, so that the area of the abutting end confines the cross-section area of the multiple water outlets, the cross-section area of the flow channel is unlikely to be enlarged. In the case of the same flow velocity, the cross-section area of the flow channel is proportional to flow rate, so that the flow rate of water through the valve seat to the valve core structure is difficult to be increased, the flow rate of water through the valve seat to the valve core structure can be increased by increasing the flow velocity, but the increase of flow velocity relates to the pipeline, there are complex influential factors, such as whether the structural strength of the valve seat and the valve core structure can bear the velocity and whether the service life is shortened, and the water source must be able to increase the flow velocity of output water.

Therefore, for the aforesaid problems in the known valve seat structure, how to develop an innovative structure with more ideal practicability is what the users desire, as well as the objective and direction of research and development the related suppliers shall break through. In view of this, based on years' experience in manufacturing, developing and designing related products, this inventor made detailed design and careful evaluation for the aforesaid objective, the present invention with practicability was obtained eventually.

BRIEF SUMMARY OF THE INVENTION

The primary object of the present invention is to provide a high flow valve seat for water control valve. The technical problem to be solved is to break through how to develop a novel high flow valve seat for water control valve with more ideal practicability which can increase the flow of water towards a valve core structure.

Based on said object, the present invention provides a high flow valve seat for water control valve, said high flow valve seat is used for watertight connection to a valve core structure, so as to form the water control valve.

The high flow valve seat comprises a main body, wherein the main body has one end and a circumferential part, the end and the valve core structure form a waterproof joint, the circumferential part surrounds the end, the main body forms a waterway and several flow channels.

The waterway and the flow channels straight extend from the end into the main body respectively, one end of the flow channel far from the end forms a closed end, the main body forms several through holes corresponding to the quantity of the flow channels. The through holes laterally extend from the circumferential part into the main body respectively, and the through holes are connected to the flow channels respectively. The through holes are circular holes, so that several external water sources supply water to the valve core structure through the through holes and the flow channels, and the water flows from the valve core structure to the waterway.

The flow channel is formed by a first wall surface, a second wall surface and a third wall surface. The first wall surface is laterally adjacent to the circumferential part, the second wall surface and the third wall surface abut on both sides of the first wall surface respectively, and the second wall surface and the third wall surface extend into the main body respectively, so as to enlarge the cross-section area of the flow channel, and to increase the flow of the water towards the valve core structure.

The flow channel is connected to the through hole on the first wall surface.

Based on the innovative structure type and technical characteristics, in comparison to prior art, the present invention can enlarge the cross-section area of the flow channel under the section constraint of the end, so as to increase the flow of water through the valve seat to the valve core structure.

DETAILED DESCRIPTION OF THE INVENTION

FIG. 1 to FIG. 4 show the embodiments of the high flow valve seat for water control valve of the present invention, but the embodiments are for illustration only, the patent application is not limited to this structure.

Figure 1:
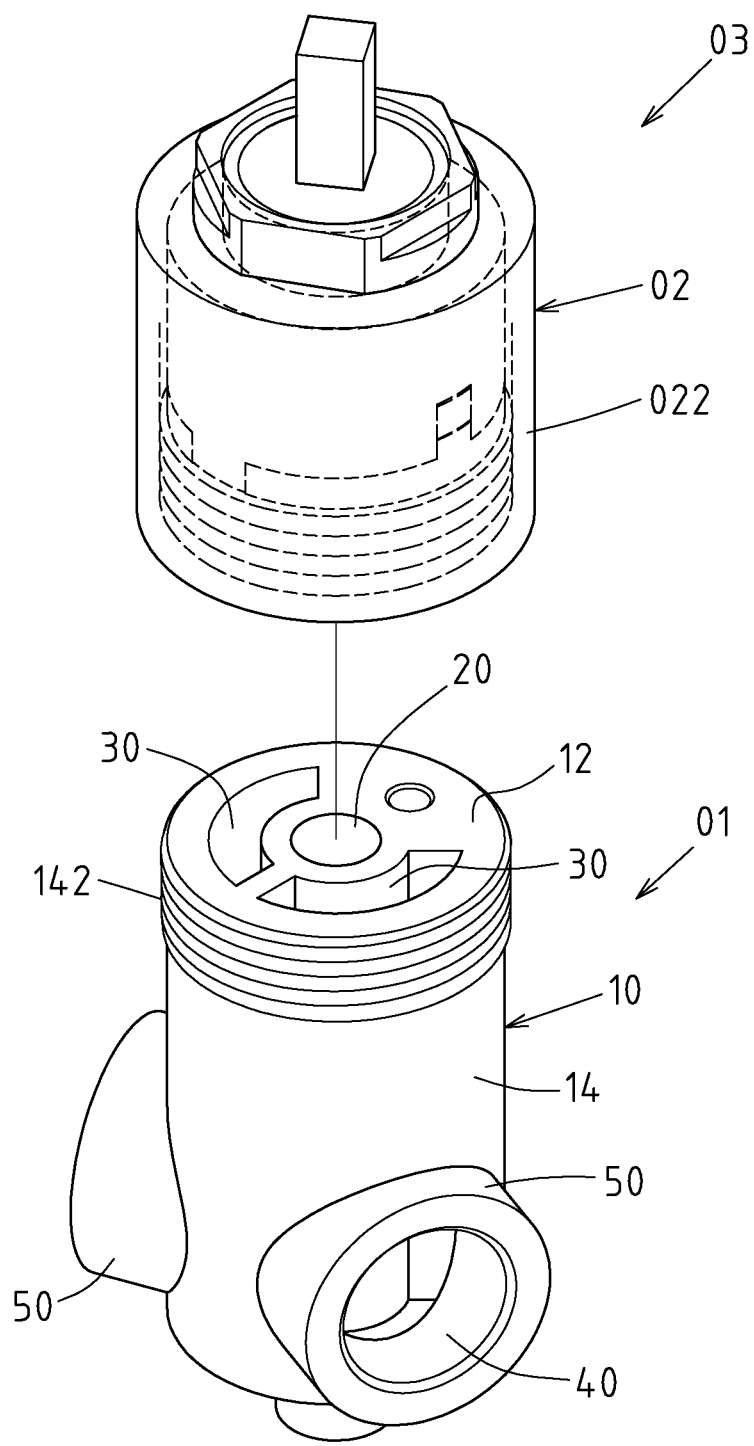
FIG. 1 is the perspective exploded diagram of water control valve in the Embodiment 1 of the present invention.
Figure 2:
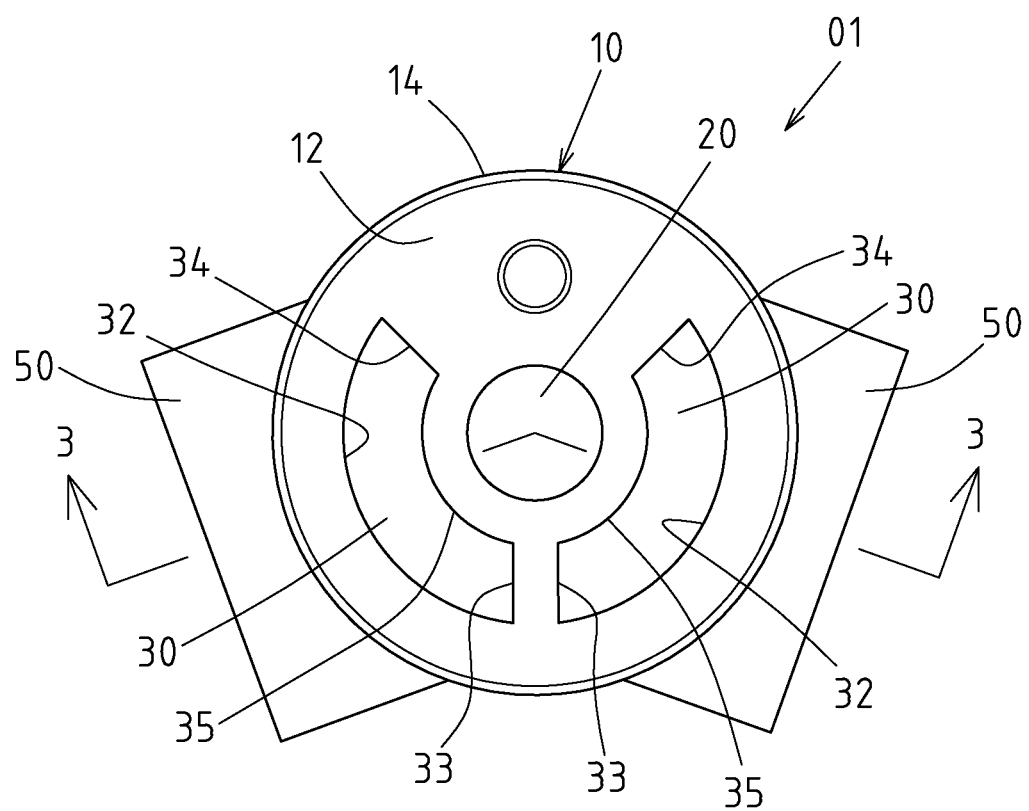
FIG. 2 is the top view of Embodiment 1 of the present invention.
Figure 3:
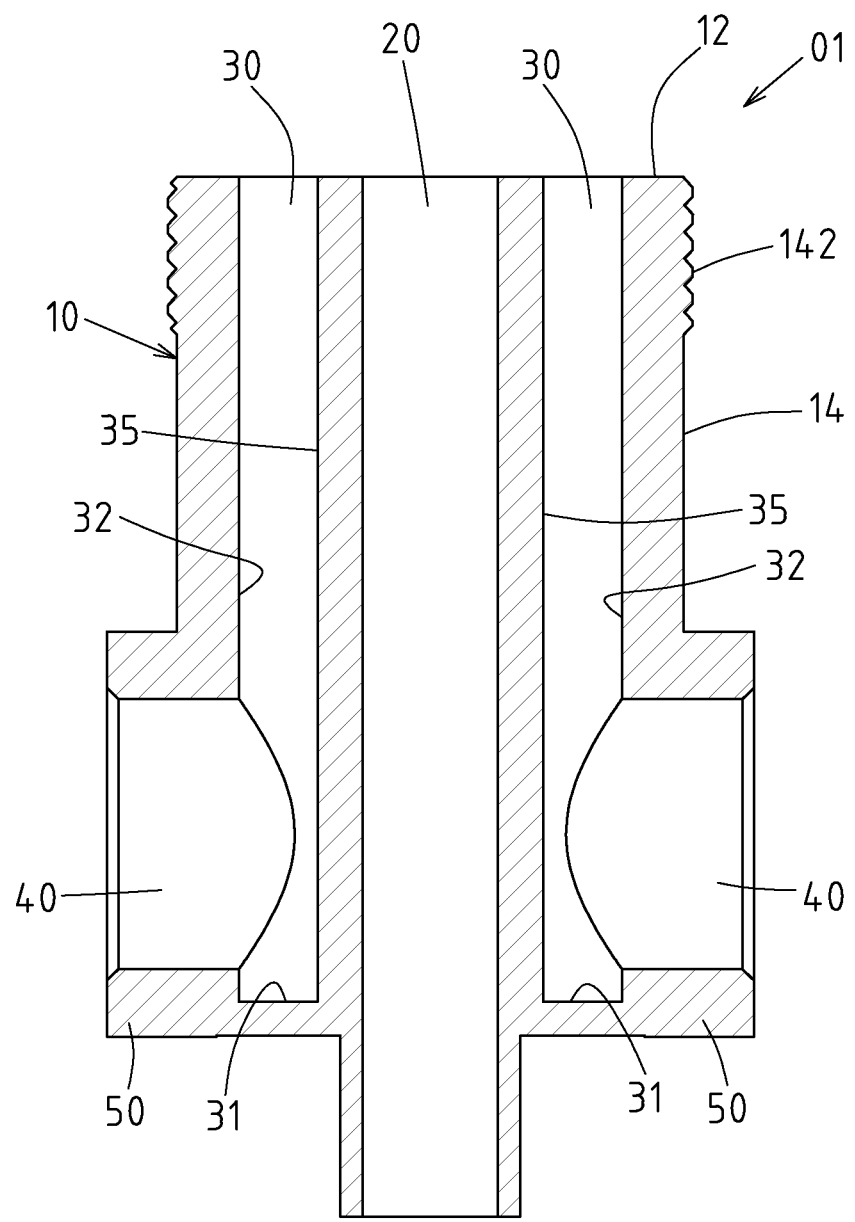
FIG. 3 is the expanded view of 3-3 profile of FIG. 2.
Figure 4:
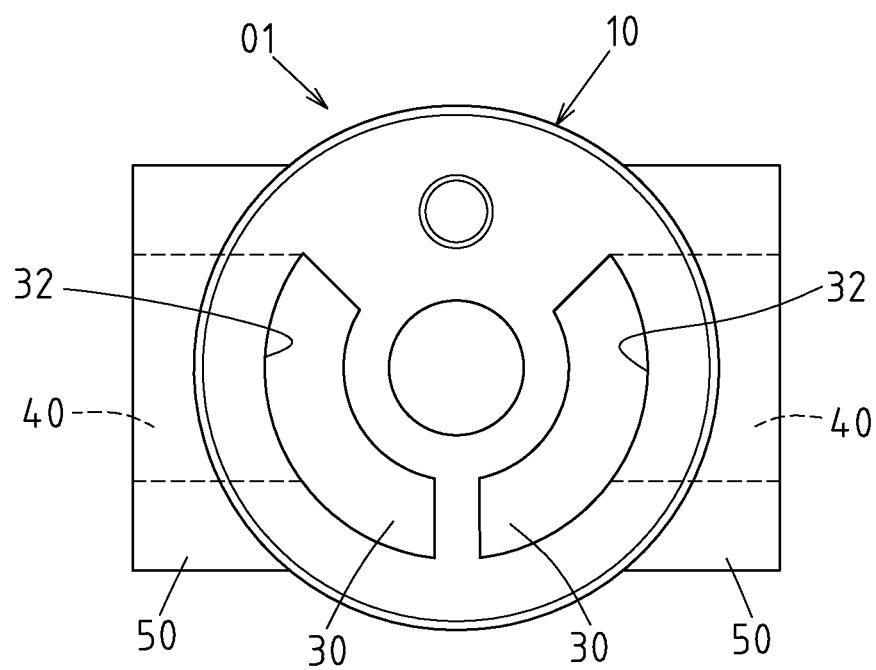
FIG. 4 is the top view of Embodiment 2 of the present invention.

As shown in FIG. 1 to FIG. 3, said high flow valve seat for water control valve 01 is used for watertight connection to a valve core structure 02, so as to form a water control valve 03. The high flow valve seat 01 has a main body 10, wherein the main body 10 has one end 12 and a circumferential part 14, the end 12 and the valve core structure 02 forms a waterproof joint, the circumferential part 14 surrounds the end 12.

The main body 10 forms a waterway 20 and several flow channels 30, the waterway 20 and the flow channels 30 straight extend from the end 12 into the main body 10 respectively, one end of the flow channel 30 far from the end 12 forms a closed end 31. The main body 10 forms several through holes 40 corresponding to the quantity of the flow channels 30. The through holes 40 laterally extend from the circumferential part 14 into the main body 10 respectively, and the through holes 40 are connected to the flow channels 30 respectively. The through holes 40 are circular holes, so that several external water sources (not shown in the figure) supply water (not shown in the figure) to the valve core structure 02 through the through holes 40 and the flow channels 30, and the water is controlled by the valve core structure 02 to flow to the waterway 20. The bend line in the central part of the waterway 20 in FIG. 2 represents the turn of 3-3 cutting plane line.

The flow channel 30 is formed of a first wall surface 32, a second wall surface 33, a third wall surface 34 and a fourth wall surface 35, wherein the first wall surface 32 is laterally adjacent to the circumferential part 14, the flow channel 30 is connected to the through hole 40 on the first wall surface 32, the second wall surface 33 and the third wall surface 34 abut on both sides of the first wall surface 32 respectively, and the second wall surface 33 and the third wall surface 34 extend into the main body 10 respectively. The fourth wall surface 35 is formed between the second wall surface 33 and the third wall surface 34. Both sides of the fourth wall surface 35 abut on the second wall surface 33 and the third wall surface 34 respectively, and the fourth wall surface 35 is opposite to the first wall surface 32, so that the first wall surface 32, the second wall surface 33, the third wall surface 34 and the fourth wall surface 35 enclose the flow channel 30, the cross-section area of the flow channel 30 is enlarged, and the flow of the water to the valve core structure 02 is increased.

As the flow channel 30 straight extends from the end 12 into the main body 10, and the flow channel 30 is a space formed of the first wall surface 32, the second wall surface 33, the third wall surface 34 and the fourth wall surface 35, Embodiment 1 can enlarge the cross-section area of the flow channel 30 under the area constraint of the end 12, in the case of constant flow velocity, the cross-section area of the flow channel 30 is proportional to the flow rate, hereby, the flow of water through the valve seat 01 to the valve core structure 02 is increased.

The cross-sectional shape of the flow channel 30 illustrated in Embodiment 1 is only a specific demonstration of the flow channel 30, not to limit the cross-sectional shape of the flow channel 30, the cross-sectional shape of the flow channel 30 can be changed as required. For example, the flow channel 30 can be formed of the first wall surface 32, the second wall surface 33 and the third wall surface 34, so as to form a transformation embodiment which is not shown in the figures, wherein the second wall surface 33 may laterally abut on the third wall surface 34, so as to make the cross-sectional shape of the flow channel 30 approximate to a triangle.

The fourth wall surface 35 can be replaced by other wall surfaces, so as to change the cross-sectional shape of the flow channel 30, forming another embodiment not shown in the figures.

The first wall surface 32 and the fourth wall surface 35 are cambered at the edge of the end 12 in Embodiment 1, the first wall surface 32 and the fourth wall surface 35 can be parallel with the circumferential part 14 respectively, the flow channel 30 is long arc shaped at the edge of the end 12.

The main body 10 can be provided with several pipe saddles 50 matching the quantity of the through holes 40, one end of the pipe saddle 50 is in contact with the circumferential part 14, the other end of the pipe saddle 50 extends away from the main body 10, the through holes 40 pass through the pipe saddles 50 respectively. The external water source is connected to the main body 10 through a hydraulic pipeline (not shown in the figure), when the water flows through the through hole 40, the hydraulic pipeline can be inserted in the through hole 40, or fitted over the pipe saddle 50, the pipe saddle 50 can enhance the convenience and reliability of connection between the hydraulic pipeline and the main body 10.

The width of the first wall surface 32 between the second wall surface 33 and the third wall surface 34 is larger than the inside diameter of the through hole 40, the through hole 40 is connected to the intermediate part of the flow channel 30 between the second wall surface 33 and the third wall surface 34 on the first wall surface 32.

As shown in FIG. 5, the difference of Embodiment 2 from Embodiment 1 is that the through hole 40 is connected to the portion of the flow channel 30 near the third wall surface 34.

As the width of the first wall surface 32 between the second wall surface 33 and the third wall surface 34 is larger than the inside diameter of the through hole 40, the water control valve 03 and the high flow valve seat 01 can change the spatial layout of the through hole 40 in the main body 10 within the range of the first wall surface 32 according to the requirement of mounting environment. When the main body 10 is provided with the pipe saddle 50, the spatial layout between the pipe saddle 50 and the main body 10 can be changed to enhance the configuration changeability of the water control valve 03 and the high flow valve seat 01.

Further, the circumferential part 14 is provided with a screw thread part 142, the screw thread part 142 is adjacent to the end 12, so that a connecting piece 022 of the valve core structure 02 is screwed on the circumferential part 14, to enhance the reliability of connection between the high flow valve seat 01 and the valve core structure 02.

I claim:

1. A valve seat assembly for use with a water control valve, the valve seat assembly comprising: a main body having one end and a circumferential part, said main body defining a waterway and a plurality of flow channels; a valve core structure in waterproof connection with the one end of said main body, the circumferential part surrounding the one end, wherein the waterway and the plurality of flow channels extend straight from the one end into said main body, an end of each of the plurality of flow channels opposite the one end of said main body defining a closed end, said main body having a plurality of through holes corresponding respectively to the plurality of flow channels, the plurality of through holes extending laterally from the circumferential part into said main body, the plurality of through holes connecting respectively to the plurality of flow channels, the plurality of through holes having a circular cross-section, the plurality of through holes being adapted to allow a plurality of external water sources to supply water to said valve core structure through the plurality of through holes and the plurality of flow channels so that water can flow from said valve core structure to the waterway, wherein each of the plurality of flow channels is formed by a first wall surface and a second wall surface and a third wall surface, the first wall surface being laterally adjacent to the circumferential part, the second wall surface and the third wall surface of abutting opposite sides of the first wall surface, the second wall surface and the third wall surface extending into said main body, wherein each of the plurality of flow channels is connected respectively to each of the plurality of through holes on the first wall surface, wherein a fourth wall surface is formed between the second wall surface and the third wall surface, the fourth wall surface having opposite sides abutting respectively the second wall surface and the third wall surface, the fourth wall surface being opposite to the first wall surface such that the first wall surface and the second wall surface and the third wall surface and the fourth wall surface encloses each of the plurality of flow channels, wherein the first wall surface and the fourth wall surface are parallel to the circumferential part, wherein each of the plurality of flow channels is an arc shape at an edge at the end thereof, wherein a width of the first wall surface between the second wall surface and the third wall surface is greater than an inner diameter of each of the plurality of through holes.

2. The valve seat assembly of claim 1, wherein the first wall surface and the fourth wall surface are cambered at the end thereof.

3. The valve seat assembly of claim 1, wherein said main body has a plurality of pipe saddles corresponding to the plurality of through holes, one end of each of the plurality of pipe saddles being in contact with the circumferential part, an opposite end of each of the plurality of pipe saddles extending away from said main body, the plurality of through holes passing respectively through the plurality of pipe saddles.

4. The valve seat assembly of claim 1, wherein the circumferential part has a screw thread part adjacent to the one end, said valve core structure having a connecting piece screwed onto the circumferential part.

* * * * *